US011842190B2

(12) United States Patent
Fang et al.

(10) Patent No.: US 11,842,190 B2
(45) Date of Patent: Dec. 12, 2023

(54) SYNCHRONIZING MULTIPLE INSTANCES OF PROJECTS

(71) Applicant: Lemon Inc., Grand Cayman (KY)

(72) Inventors: Cheng Fang, Beijing (CN); Lakshminarayanan Vijayaraghavan, Los Angeles, CA (US); Siyao Yang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/578,299

(22) Filed: Jan. 18, 2022

(65) Prior Publication Data

US 2023/0229443 A1 Jul. 20, 2023

(51) Int. Cl.
*G06F 8/77* (2018.01)
*H04L 7/00* (2006.01)

(52) U.S. Cl.
CPC ............. *G06F 8/77* (2013.01); *H04L 7/0016* (2013.01)

(58) Field of Classification Search
None
See application file for complete search history.

(56) References Cited

U.S. PATENT DOCUMENTS

| 6,073,177 | A | * | 6/2000 | Hebel | ...................... | H04L 61/00 |
| | | | | | | 709/227 |
| 6,535,892 | B1 | * | 3/2003 | LaRue | ................... | G06F 16/27 |
| | | | | | | 707/999.203 |
| 8,117,344 | B2 | * | 2/2012 | Mendez | ............... | G06F 21/6218 |
| | | | | | | 709/224 |
| 10,445,762 | B1 | * | 10/2019 | Ho | .................... | H04N 21/25891 |
| 2010/0274848 | A1 | * | 10/2010 | Altmaier | ................. | H04L 67/14 |
| | | | | | | 709/228 |
| 2015/0100406 | A1 | * | 4/2015 | Klimetschek | ...... | G06Q 30/0242 |
| | | | | | | 705/14.41 |

(Continued)

FOREIGN PATENT DOCUMENTS

CN 109299046 A 2/2019

OTHER PUBLICATIONS

V. R. S. Ferreira, L. F. d. Paiva, A. C. d. Paiva, R. C. d. Oliveira, M. S. S. Mendes and I. M. O. Maia, "Authoring and Visualization Tool for Augmented Scenic Performances Prototyping and Experience," 2020 22nd Symp. on Virtual and Augmented Reality (SVR), Porto de Galinhas, Brazil, 2020, pp. 413-419 (Year: 2020).*

(Continued)

*Primary Examiner* — Andrew M. Lyons
(74) *Attorney, Agent, or Firm* — BakerHostetler

(57) ABSTRACT

The present disclosure describes techniques for synchronizing multiple instances of projects. At least one Transmission Control Protocol (TCP) connection may be established between a server computing device and at least one client computing device. At least one dual instance command may be created. The at least one dual instance command comprises data associated with a project and information indicating how to interpret the data. A plurality of instances of the project may be synchronized between the server computing device and the at least one client computing device by transmitting the at least one dual instance command between the server computing device and the at least one client computing device via the at least one TCP connection.

20 Claims, 11 Drawing Sheets

(56) References Cited

U.S. PATENT DOCUMENTS

| | | | | |
|---|---|---|---|---|
| 2015/0172381 A1* | 6/2015 | Krueger | ............. | H04L 67/1095 |
| | | | | 715/751 |
| 2022/0060541 A1* | 2/2022 | Shokooh | ................ | G06F 16/27 |
| 2023/0215465 A1* | 7/2023 | Crichton | ............. | G11B 27/031 |
| | | | | 715/723 |

OTHER PUBLICATIONS

International Patent Application No. PCT/SG2023/050018; Int'l Search Report; dated Aug. 1, 2023; 4 pages.
"TCP/IP"; https://wang-yimu.com/tcp-ip/; Tech Target; Dec. 2019; accessed Jul. 19, 2023; 9 pages.
Huo et al.; "SynchronizAR: Instant Synchronization for Spontaneous and Spatial Collaborations in Augmented Reality"; 31st Annual ACM Symposium on User Interface Software and Technology; Oct. 2018; 12 pages.
Vidal-Balea et al.; "Creating Collaborative Augmented Reality Experiences for Industry 4.0 Training and Assistance Applications: Performance Evaluation in the Shipyard of the Future"; Applied Sciences; vol. 10; 2020; 23 pages.
Apicharttrisorn et al.; "Characterization of Multi-User Augmented Reality over Cellular Networks"; IEEE Secon; Jun. 2020; 16 pages (also contains Abstract).

\* cited by examiner

```
enum class TransportType
{
    OBJECT,
    TEXTURE,
};

enum class CommandType
{
    UNKNOWN = -1,
    RESET,
    RESET_REQUEST,
    READ_FILE,
    READ_FILE_RESPONSE,
    TRANSPORT,
    TRANSPORT_RESPONSE,
    TRANSPORT_STICKER,
    TRANSPORT_STICKER_RESPONSE,
    SET_PROPERTY,
    CREATE_OBJECT,
    SET_WATCH_VALUE,
    CLEAR_WATCH_VALUE,
    OBJECT_PATH,
    CUSTOM_ATTRIBUTE,
    CALL_METHOD,
    GET_RT_DATA,
    GET_RT_DATA_RESPONSE,
    COMMAND_FAILED,
    UPDATE_SCRIPT_VALUE,
};
```

FIG. 5

1000

Create an editor dual instance manager, wherein the editor dual instance manager holds a server socket and information indicative of at least one Internet Protocol (IP) address and at least one port number associated with at least one client computing device 1002

Create at least one runtime dual instance manager, wherein the at least one runtime dual instance manager holds a client socket and information indicative of an Internet Protocol (IP) address and a port number associated with a server computing device 1004

Establish at least one Transmission Control Protocol (TCP) connection between the server computing device and the at least one client computing device 1006

Create at least one dual instance command, the at least one dual instance command comprises data associated with a project and information indicating how to interpret the data 1008

Synchronize a plurality of instances of the project between the server computing device and the at least one client computing device by transmitting the at least one dual instance command between the server computing device and the at least one client computing device via the at least one TCP connection 1010

Synchronize a second plurality of instances of a second project between the server computing device and the at least one client computing device by transmitting at least one second dual instance command between the server computing device and the at least one client computing device 1012

FIG. 10

SYNCHRONIZING MULTIPLE INSTANCES OF PROJECTS

BACKGROUND

Communication is increasingly being conducted using Internet-based tools. The Internet-based tools may be any software or platform. Such internet-based tools may design new programs or features, such as visual effects, for the users of the internet-based tools. However, the design process for such new features can be complicated or inefficient. Improved techniques for feature design are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows exemplary dual instance commands.

FIG. 10 shows another example process for running multiple preview windows using dual instance.

DETAILED DESCRIPTION OF ILLUSTRATIVE EMBODIMENTS

Figure 1:
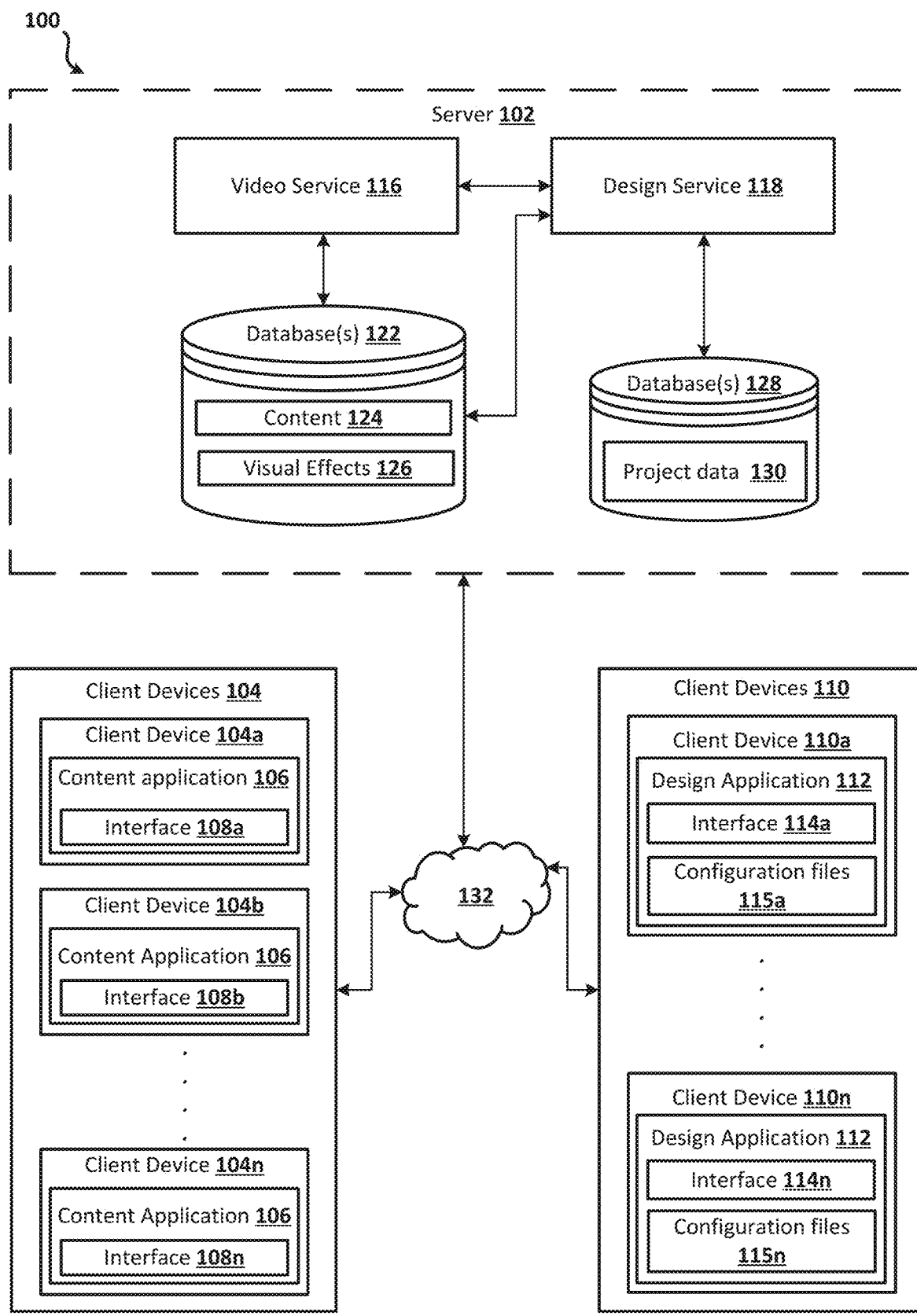
FIG. 1 shows an example system for designing new features which may be used in accordance with the present disclosure.

Communication can be conducted using Internet-based tools that allow users to create content and distribute such content to other users for consumption. Such Internet-based tools may provide users with various effects to use when creating content. The effects can include, for example, augmented reality (AR) effects. AR effects are computer-generated effects layered over the real-life image that a user's camera displays. For example, if a user wants to create content using an AR effect, the user may open a device's camera to present the physical world onscreen live. The AR effect superimposes or overlays two-dimensional (2D) or three-dimensional (3D) virtual objects on the camera feed, creating the illusion that these objects actually exist.

However, designing such AR effects can be complicated and time-consuming. When front-end engineers, such as UI/UX designers (hereafter referred to as "designers") work on complicated effects, a lot of time is wasted on repetitive testing of multiple inputs, such as different facial expressions or text. Creating complicated effects with a single preview window can be cumbersome, especially if a designer wants to compare multiple versions of an effect with tweaked parameters. For example, a game effect might have a win, loss, and tie state. Testing each of these states would require the designer to play the game at least three times every time he or she makes a script change or a visual change. To complicate matters further, designers often have multiple variations of visual assets, such as user interface (UI) elements, that they want to compare. It may be time-consuming for designers to do so, as the designers may not be equipped with tools that allow them to perform AB testing on these visual differences. Additionally, when working with multiple platforms, it is important for a designer to be able to preview the effect at one or more desired destinations. For example, the designer may want to run the preview on more than one of a mobile device (e.g., phone, tablet, etc.), web, another computer etc. This may help the designer visualize the target effect at the end point.

Described herein are techniques that facilitate the improved design and testing of complicated effects, such as AR effects. Using the techniques described herein, multiple preview windows may be run. Multiple preview windows may be run by running two instances of a design engine (e.g., editor and preview window) to achieve a decoupled and modularized methodology to load and run effects on the platform and communicate with the host instance (the editor).

Accordingly, a designer can spawn multiple preview windows associated with a single effects design project. Each preview window may allow the designer to view a different version of an effect while simultaneously viewing the versions of the effect displayed in the other preview windows. For example, the designer can spawn multiple preview windows on a 3D scene in a game engine. Each preview window displays the current state of the effect as well as any additional objects that the designer has added to that scene. The content displayed in each preview window can be adjusted separately from the content displayed in the other preview windows. For example, each preview window can retain changes that are unique to itself. Thus, running multiple preview windows allows for faster testing of edge cases and inputs in parallel and provide designers with an easier way to compare different visual asset choices side-by-side.

FIG. 1 illustrates an example system 100 for designing new features, such as effects, that may be used to create content for distribution. The system 100 may comprise a server 102, a first plurality of client devices 104a-n, and a second plurality of client devices 110a-n. The server 102, the first plurality of client devices 104a-n, and/or the second plurality of client devices 110a-n may communicate with each other via one or more networks 132.

The server 102 may be located at a data center, such as a single premise, or be distributed throughout different geographic locations (e.g., at several premises). The server 102 may provide services, such as a video service 116 and/or a design service 118, via the one or more networks 132. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The server 102 may provide the video service 116. The video service 116 may comprise a content streaming service, such as an Internet protocol video streaming service. The video service 116 may be configured to distribute content 124 via a variety of transmission techniques. The video service 116 is configured to provide the content 124, such as video, audio, textual data, a combination thereof, and/or the like. The content 124 may comprise content streams (e.g., video stream, audio stream, information stream), content files (e.g., video file, audio file, text file), and/or other data. The content 124 may be stored in a database 122. For example, the video service 116 may comprise a video sharing service, a video hosting platform, a content distribution platform, a collaborative gaming platform, and/or the like.

In an embodiment, the content 124 distributed or provided by the video service 116 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, performing practical jokes, or giving advice, such as beauty and fashion advice, cooking tips, or home renovation tips.

In an embodiment, the content 124 may be output to different client devices 104a-n via the network 132. The content 124 may be streamed to the client devices 104a-n. The content stream may be a stream of short videos received from the video service 116. The first plurality of client devices 104a-n may be configured to access the content 124 from the video service 116. In an embodiment, a client device 104a-n may comprise a content application 106. The content application 106 outputs (e.g., display, render, present) the content 124 to a user associated with the client device 104a-n. The content may comprise videos, audio, comments, textual data and/or the like.

The first plurality of client devices 104a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The first plurality of client devices 104a-n may be associated with one or more users. A single user may use one or more of the first plurality of client devices 104a-n to access the server 102. The first plurality of client devices 104a-n may travel to a variety of locations and use different networks to access the server 102.

The video service 116 may be configured to receive input from users. The users may be registered as users of the video service 116 and may be users of the content application 106 operating on client devices 104a-n. The user inputs may include short videos created by users, user comments associated with short videos, or "likes" associated with short videos. The user inputs may include connection requests and user input data, such as text data, digital image data, or user content. The connection requests may comprise requests from the client devices 104a-na-d to connect to the video service 116. The user input data may include information, such as short videos and/or user comments, that the users connected to the video service 116 want to share with other connected users of the video service 116.

In an embodiment, a user may use the content application 106 on a client device 104a-n to create a short video and upload the short video to the server 102. The client devices 104a-n may access an interface 108a-n of the content application 106. The interface 108a-n may comprise an input element. For example, the input element may be configured to allow users to create the short video. To create the short video, the user may give the content application 106 permission to access an image capture device, such as a camera, or a microphone of the client device 104a-n. Using the content application 106, the user may select a duration for the short video or set a speed for the short video, such as "slow-motion" or "speed things up."

The user may edit the short video using the content application 106. The user may add one or more texts, filters, sounds, or effects, such as AR effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104a-n. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the server 102 and/or to save the short video locally to the user device 104a-n. When a user uploads the short video to the server 102, they may choose whether they want the short video to be viewable by all other users of the content application 106 or viewable by only a subset of the users of the content application 106. The video service 116 may store the uploaded short videos and any metadata associated with the short videos as content 124 in one or more databases 122.

In an embodiment, a user may use the content application 106 on a client device 104a-n to provide input on a short video. The client devices 104a-n may access an interface 108a-n of the content application 106 that allows users to provide input associated with short videos. The interface 108a-n may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The video service 116 may store the input and associated metadata in a database 122.

The video service 116 may be configured to output the uploaded short videos and user input to other users. The users may be registered as users of the video service 116 to view short videos created by other users. The users may be users of the content application 106 operating on client devices 104a-n. The content application 106 may output (display, render, present) the short videos and user comments to a user associated with a client device 104a-n. The client devices 104a-n may access an interface 108a-n of the content application 106. The interface 108a-n may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The video service 116 may output the short video and the associated comments simultaneously. Comments may be output by the video service 116 in real-time or near-real-time. The content application 106 may display the short videos and comments in various ways on the client device 104a-n. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

In an embodiment, a design service 118 and/or a design application 112 may provide a plurality of visual effects 126 to users of the video service 116 so that the users can create videos, such as short videos, using one or more of these effects. The effects 126 can include, for example, one or more AR effects. AR effects are computer-generated effects layered over the real-life image that a user's camera displays. However, for the reasons described above, designing such effects 126 can be complicated and time-consuming.

The design service 118 may be configured to facilitate the design of effects 126 by a designer associated with a client device of the second plurality of client devices 110a-n. The second plurality of client devices 110a-n may be different from the first plurality of client devices 104a-n. For example, the second plurality of client devices 110a-n may each be associated with one or more designers that want to design an effect 126, so that the users associated with the first plurality of client devices 104a-n can create videos using the designed effects 126 via the content application 106. The second plurality of client devices 110a-n may comprise the design application 112. The design application 112 may be used by the designers to design effects 126. For example, the designers can access an interface 114a-n of the design application 112 to design effects 126.

The second plurality of client devices 110a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. A single designer may use one or more of the second plurality of client devices 110a-n to access the server 102. The second plurality of client devices 110a-n may travel to a variety of locations and use different networks to access the server 102.

The design service 118 may be configured to maintain, in a database 128, project data 130. The stored project data 130 may be received, for example, from designers associated with the client devices 110a-n. The project data 130 may include data associated with various design projects. Each design project may be associated with the design of a particular effect 126. For example, the project data 130 may include data associated with a first project. The first project may be associated with the design of a first effect 126, and the first project may be associated with one or more scenes that comprise the first effect 126. The project data 130 associated with the first project may indicate the current state of the design of the first effect 126. For example, the project data 130 associated with the first project may indicate all work that has been saved and/or uploaded to the server 102. However, the project data 130 may not indicate changes or modifications to first effect 126 that the designer tried out or tested during the design process but decided not to implement.

In an embodiment, the design service 118 is configured to send, to client devices 110a-n, the project data 130. For example, the design service 118 may send, to a client device 110a-n, the project data 130 associated with a first project in response to receiving a request from that client device. The request may include an indication of a selection of the first project. For example, a designer may select the first project if the designer wants to work on the design of the first effect. The designer may want to work on the project for the first time, or the designer may want to continue previous work that the designer (or even another designer) has done on the first project. In response to receiving such a request, the design service 118 can send the project data 130 indicating the current state of the first project to the client device 110a-n.

In embodiments, the client devices 110a-n are configured to receive, from the design service 118, the project data 130. For example, the client devices 110a-n may receive the project data 130 associated with the first project in response to sending a request for the project data 130 associated with the first project to the design service 118. The client devices 110a-n may send the request for the project data 130 associated with the first project to the design service 118 if the designer selects the first project in the design application 112 via the interface 114a-n of the design application 112. The designer may select the first project in the design application if the designer wants to start or continue work on the design of the first effect.

In embodiments, if the client devices 110a-n receive, from the design service 118, project data 130, a main preview window of at least one scene comprising the first effect may be displayed on the interface 114a-n. As described above, the project data 130 associated with a particular project may indicate the current design state of the effect associated with that project. Accordingly, the main preview window provides a display or preview of what the effect would currently look like to a user 104*a-n* when it is applied on an image or video feed, based on the current design state of the effect. For example, the main preview window may render an AR effect to a 2D texture. The designer can view the main preview window to gain an understanding of how the original scene would look (e.g., how the effect would look if no more changes or modifications were made to the design of the effect).

In embodiments, the designers may utilize the design application 112 to test out various changes to a scene comprising an effect. For example, after the main preview window of a scene comprising the first effect is displayed on the interface 114*a-n*, a designer may want to see the impact of various modifications or changes to the design of the effect. To do so, the designer can utilize the design application 112 to spawn multiple secondary preview windows associated with the project. Each secondary preview window may resemble the main preview window. For example, each secondary preview window may render an AR effect to a 2D texture. To spawn a secondary preview window associated with the project, the designer may select a button (e.g., a (+) button) on the interface 114*a-n* of the design application. Each time the designer selects the button, an additional secondary preview window may be spawned and displayed on the interface 114*a-n*. The designer may spawn as many secondary preview windows as he or she desires.

Each secondary preview window displays the current state of the effect (such as that indicated by the main preview window) as well as any additional objects that the designer has added to that scene to test them out. The content displayed in each secondary preview window can be adjusted separately from the content displayed in the other secondary preview windows. Such adjustments may only apply locally (e.g., only apply on the client devices 110*a-n*) and will not appear on the design service 118 side, because one purpose of these multiple secondary preview windows is to test what edits to properties of the original scene would look like (and not necessarily to make final adjustments to the project data 130).

In embodiments, data associated with the multiple secondary preview windows may be saved in individual configuration files 115*a-n*. For example, if a designer spawns three secondary preview windows associated with the first effect design project, three configuration files, one corresponding to each secondary preview window, may be saved locally on the client device 110*a-n*, but not on the server-side (e.g., may not be saved as project data 130). The configuration files 115*a-n* may be modified to indicate the adjustments made to content displayed in the corresponding secondary preview window. For example, if a designer makes a change to at least one attribute of the effect in a particular secondary preview window corresponding to a particular configuration file, that particular configuration file may be modified to reflect this attribute change. The modified configuration files may be further modified if/when additional design changes are made. In embodiments, the project data 120 may comprise a "main" configuration file in the root of a project folder. The main configuration file may be utilized to keep track of how many secondary preview windows a project contains. This may allow the project to automatically spawn the preview processes.

In an embodiment, a designer may want to pick-up a design project where he or she last left off. For example, a designer may have made a change to at least one attribute of an effect in a particular secondary preview window corresponding to a particular configuration file. That particular configuration file may have already been modified to reflect this attribute change. The designer may decide to take a break or exit out of the design application 112. The designer (or a different designer) may later load the locally saved, modified configuration files to continue work on the design project. If the designer (or a different designer) later loads the locally saved, modified configuration files, secondary preview windows may be displayed based on the modified configuration files. The designer may make additional design changes within the secondary preview windows. If so, the modified configuration files may be further modified and saved locally.

In an embodiment, the designer may want to make an actual change (not just a locally saved change) to the design of an effect 126. For example, after viewing the previous window(s), the designer may decide that the designer likes the way a particular design change or modification looks. The designer may decide that this particular design change or modification should be implemented in the final design of the effect 126. Accordingly, the designer may indicate, such as via the interface 114*a-n* of the design application 112, that such design change or modification should be made on the server-side. If the designer does so, an indication may be sent to the design service 118. The indication may instruct the design service 118 to update the project data 130 associated with the project of the corresponding effect based on this design change or modification.

In an embodiment, the design service 118 is configured to receive, from client devices 110*a-n*, data indicative of updates (e.g., changes or modifications) to the project data 130. For example, the design service 118 can receive the indication that instructs the design service 118 to update the project data 130 associated with a project corresponding to an effect that has a modified or changed design. The design service 118 may update the project data 130 in response to receiving such an indication.

When the design service 118 makes changes to the project data 130 associated with an effect, the design service 118 may send a message (e.g., socket message) to the client devices 110*a-n* instructing the client devices 110*a-n* to update the main preview window displaying a scene comprising the effect. As a result, the designer that made the change or modification to the effect may see the main preview window change so that the main preview window now reflects the recent change or modification. Additionally, any other designer that later works on the design of this particular effect will see this updated main preview window (instead of the preview window that was displayed before these changes to the design were implemented). If the main preview window displaying a scene comprising the effect is updated, any spawned secondary preview window that is currently open (or that is opened at a later time) can additionally be updated to reflect the recent design change or modification.

In an embodiment, after a designer has used the design service 118 to create an effect, the effect may be stored as a visual effect 126 in the database 122. The stored effect 126 can be used by the users associated with the first plurality of client devices 104*a-n* to create videos via the content application 106. As described above, the plurality of effects 126 can include one or more AR effects. If the user selects an AR effect to create a video, the AR effect may overlay or superimpose at least one 2D or 3D virtual object on at least one subset of frames of the video. For example, if the user wants to create a video using an AR effect, the user may open a camera of a client device 104*a-n* to present the physical world onscreen live. The AR effect superimposes or overlays 2D or 3D virtual objects on the camera feed, creating the illusion that these objects actually exist. After the video has been created with the effect, the video may be uploaded to the server 102 and/or the user may save the video locally to the client device 104a-n. The video service 116 may be configured to output the uploaded video created with the effect to other users that are registered as users of the video service 116 via the content application 106. The other users may consume the video created with the effect.

Figure 2:
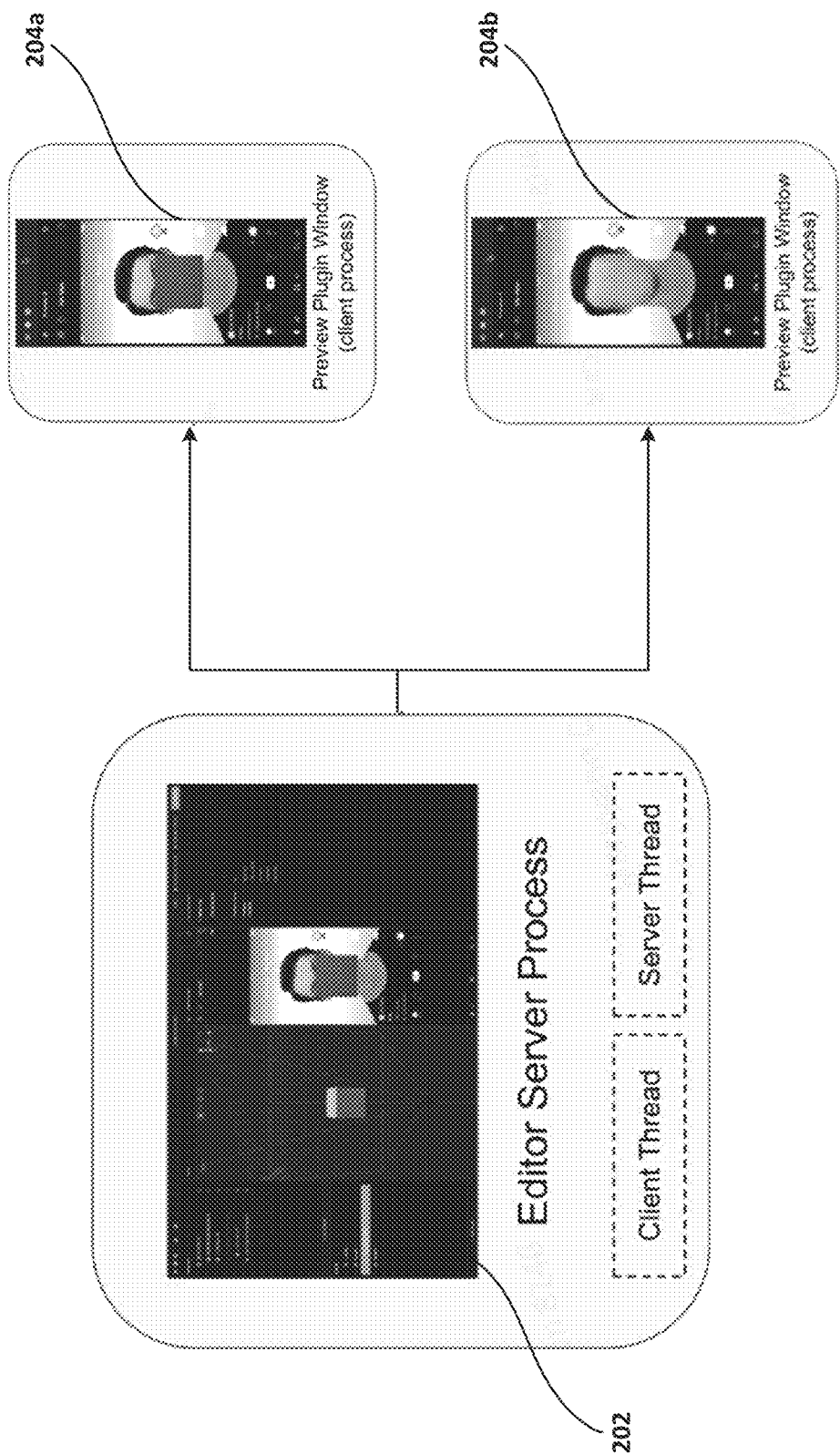
FIG. 2 shows an example of multiple preview windows in accordance with the present disclosure.

FIG. 2 shows an exemplary main preview window 202 and multiple secondary preview windows 204a-b that enable a designer to do AB testing of effects and other effect changes in real-time. As described above, a designer may decide to work on a design project. For example, the designer may decide to work on the design of a visual effect. The client devices 110a-n may receive the project data (e.g., project data 130) associated with the desired project in response to sending a request for the project data associated with the project to the design service (e.g., design service 118). The client devices 110a-n may send the request for the project data associated with the project to the design service if the designer selects that project in the design application via the interface of the design application. The designer may select the project if the designer wants to start or continue work on the design of the effect associated with that project.

If the client devices 110a-n receive, from the design service, project data, the main preview window 202 of a scene comprising the effect may be displayed on the interface. As described above, the project data associated with the project may indicate the current design state of the effect associated with that project. Accordingly, the main preview window 202 provides a display or preview of what the effect would currently look like to a user 104a-n, based on the current design state of the effect. The designer can view the main preview window 202 to gain an understanding of how the effect would look if no more changes or modifications were made to the design of the effect.

In embodiments, the designers may test out various changes to the scene comprising the effect. For example, after the main preview window 202 of the scene comprising the effect is displayed, a designer may want to see the impact of various modifications or changes to the design of the effect. To do so, the designer can spawn multiple secondary preview windows 204a-b associated with the project. To spawn each secondary preview window 204a-b associated with the project, the designer may select a button (e.g., a (+) button) on the interface 114a-n of the design application. Each time the designer selects the button, an additional secondary preview window may be spawned and displayed. The designer may spawn as many secondary preview windows as he or she desires. The secondary windows 204a-b are configured to enable AB testing and comparison of different versions of the visual effect in the scene at an approximately same time.

The multiple windows, such as the main preview window 202 and the secondary windows 204a-b, may be spawned using the dual instance technology described herein. The first instance is the main preview window 202 (e.g., host). The first instance may be the editor. The additional (second, third, etc.) instances are the secondary windows 204a-b running on the client devices. Thus, dual instance may facilitate the establishment of a network of game engine instances running in either separate processes or separate threads. The instances may be powered by the dual instance technology to share and synchronize data among them.

One of the core characteristics of the dual instance technology is its ability to synchronize various instances (clones) of projects to maintain synchronization. For example, dual instance may synchronize the main preview window 202 with the secondary preview windows 204a-b. If a change/edit is made to the main preview window 202, then dual instance may show this change being made in the secondary preview windows 204a-b as well. Each process or thread may run a local version of the project and may maintain a 100% sync with the main project in the main preview window 202.

The networked solution of the editor-runtime pair of instances is what is referred to herein as the "dual instance." The dual instance supports the ability to run a multi-process preview on a different clients such as a computer, web, mobile, etc., the ability to seamlessly update inspector properties in the editor to see real-time updates on the destination clients, the ability to send and receive editor updates through the network using TCP protocol(s) on the runtime instance, and the ability to send final processed image(s) from the client back to the editor (any data type, not limited to images) using network or thread. The dual instance also supports loading video, image, and camera frame inputs from file systems across all the preview instances for effect processing using dual instance.

Figure 3:
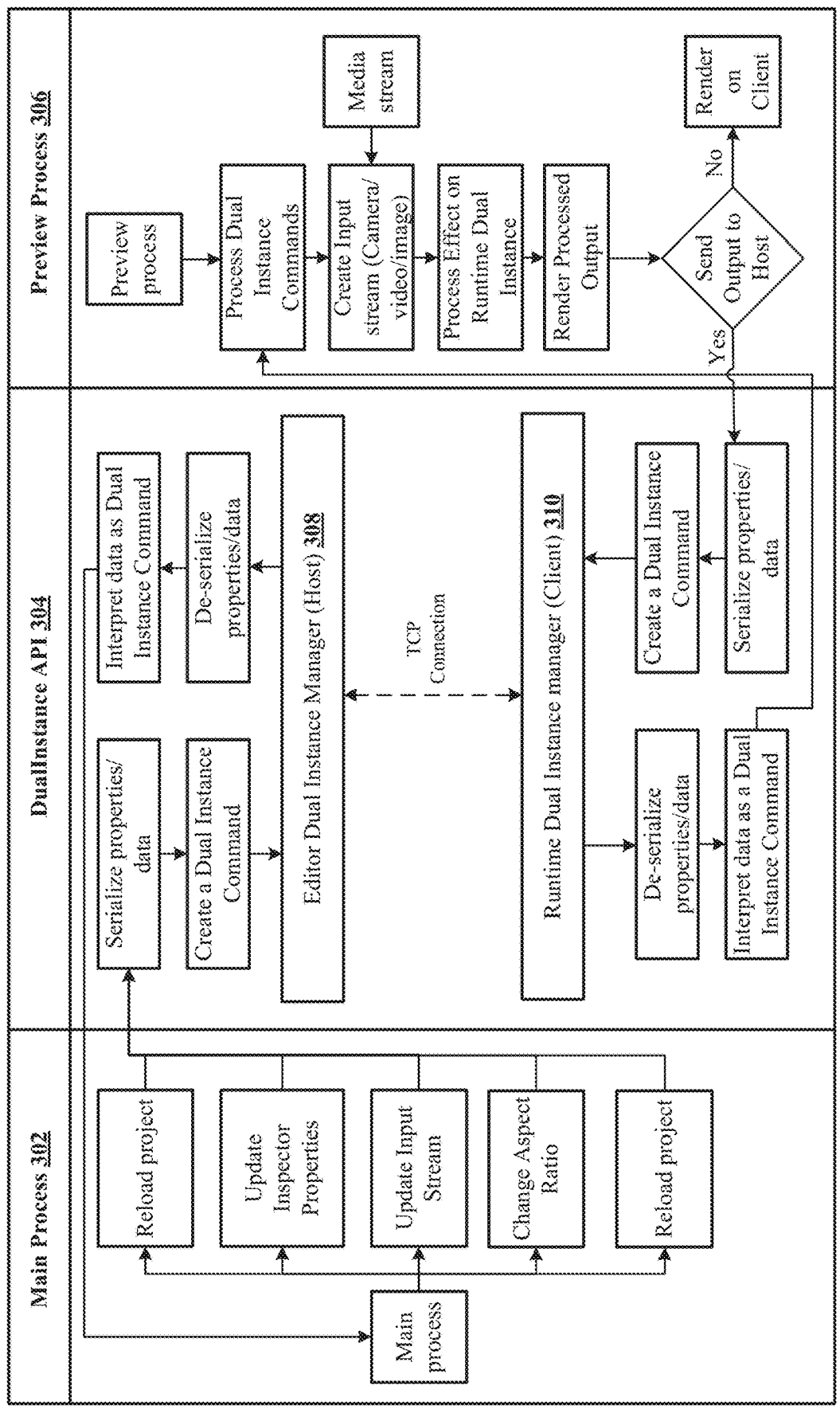
FIG. 3 shows an exemplary flow diagram illustrating the running of multiple preview windows using dual instance.

FIG. 3 illustrates an exemplary flow diagram 300 illustrating the running of multiple preview windows using dual instance. The dual instance API 304 may establish a Transmission Control Protocol (TCP) connection between a main process 302 (e.g., server computing device) and a preview process 306 (e.g., at least one client computing device). TCP is connection-oriented communications protocol that facilitates the exchange of messages between computing devices in a network. The server computing device may, for example, include the design service 118. The client computing device(s) may, for example, include the client devices 110a-n.

In embodiments, the dual instance API 304 may include an editor dual instance manager 308. The editor dual instance manager 308 may hold a server socket. The editor dual instance manager 308 may additionally or alternatively include information indicative of at least one Internet Protocol (IP) address and at least one port number associated with at least one client computing device. Likewise, the dual instance API 304 may include a runtime dual instance manager 310. The runtime dual instance manager 310 may hold a client socket. The runtime dual instance manager 310 may additionally or alternatively include information indicative of an IP address and a port number associated with the server computing device. Establishing the TCP connection between a main process 302 (e.g., server computing device) and a preview process 306 (e.g., at least one client computing device) may comprise establishing a TCP connection between the editor dual instance manager 308 and the runtime dual instance manager 310.

The dual instance API 304 may receive, from the main process 302, data or properties. The data may be data associated with a design project. The data may be automatically detected/received, for example, if a designer makes a modification/change to a project, loads a new project, and/or reloads a project. The data associated with a project may comprise data indicative of an image or a video. For example, the data may include data indicative of any change made to the project by the server computing device. The data or properties may include, for example, data associated with reloading a project, data associated with an update to inspector properties, data associated with an update to an input stream, data associated with loading a new design project, and/or data associated with a change to an aspect ratio.

In embodiments, the dual instance API 304 may, in response to receiving the data from the main process 302, serialize the data. The serialized data may then be encoded into at least one dual instance command. Dual instance commands are protocols that contain data and identifiers. A particular dual instance command can be tailored to serve a single purpose. Each command will have its own type of data, its own identifier, etc. The dual instance command(s) may comprise identification information indicative of a type of the dual instance command. There may be a plurality of types of dual instance commands. Dual instance commands are discussed below in more detail with regard to FIG. 5.

In embodiments, the dual instance API 304 may send or forward the dual instance command(s) to the editor dual instance manager 308. The editor dual instance manager 308 may send, via the TCP connection, the dual instance command(s) to the runtime dual instance manager 310. The runtime dual instance manager 310 may, in response to receiving the dual instance command(s), decode the at least one dual instance command and deserialize the data. The runtime dual instance manager 310 may then send the dual instance command and its attached data to the preview process 306

The preview process 306 may receive the dual instance command data from the dual instance API 304. The preview process 306 may process the received dual instance command data and utilize it to sync properties and/or sync the entire project between various instances (e.g., 1 Editor×N previews). The preview process 306 may, after, processing the dual instance command data, create an input stream, process the effect on a runtime dual instance, and render the processed output. For example, when a new object (e.g., a cube) is added in the main preview window, this addition may be instantly synchronized across all the preview instances (e.g., secondary preview windows). This guarantees that all instances of the project instances are identical.

The preview process 306 may send, back to the dual instance API 304, an output render texture. The dual instance API 304 may receive the output render texture and serialize the properties/data. The serialized data may then be encoded into at least one dual instance command. The dual instance command(s) may be sent or forwarded to the runtime dual instance manager 310. The runtime dual instance manager 310 may send, via the TCP connection, the dual instance command(s) to the editor dual instance manager 308. The editor dual instance manager 308 may, in response to receiving the dual instance command(s), decode the at least one dual instance command and deserialize the data. The editor dual instance manager 308 may then send the dual instance command and its attached data to the main process 302.

Figure 4:
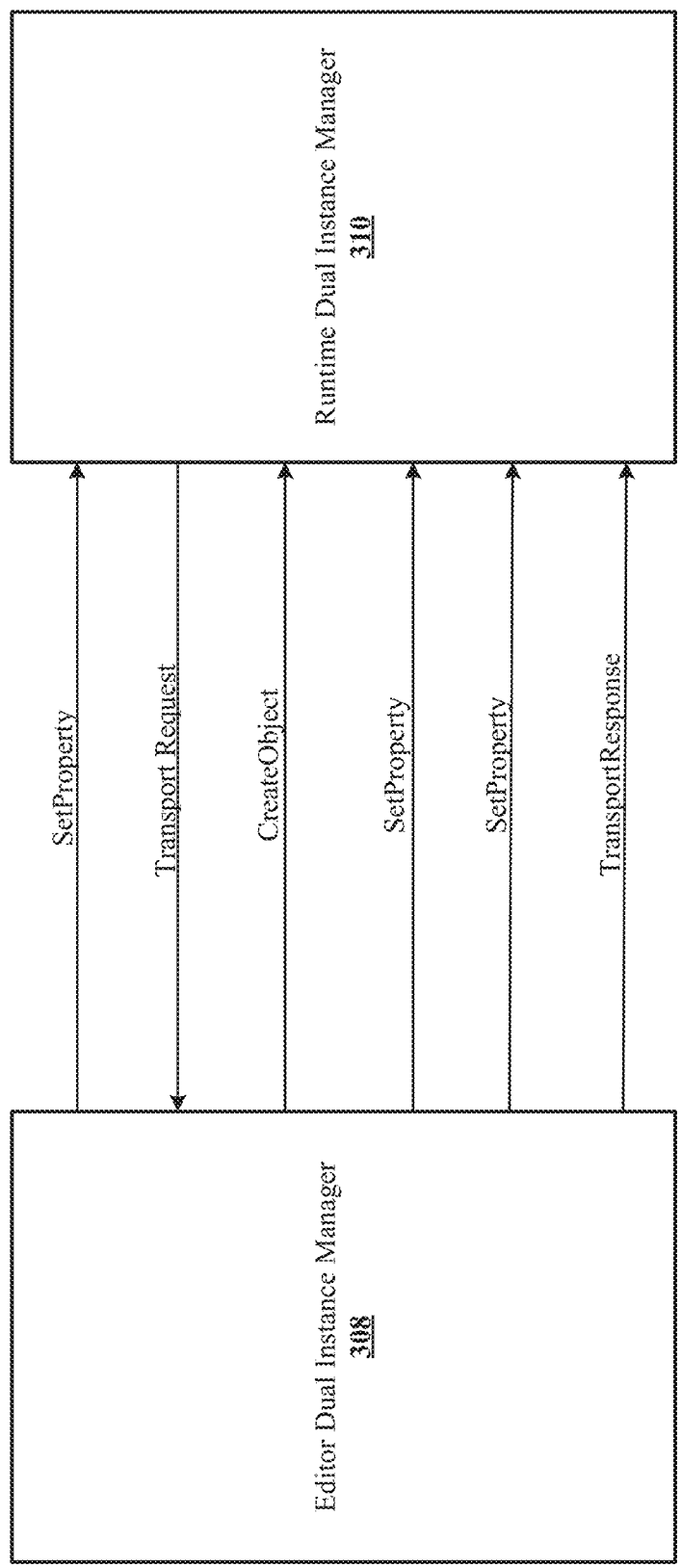
FIG. 4 shows an exemplary diagram illustrating communication between an editor dual instance manager and a runtime dual instance manager.

FIG. 4 shows an exemplary diagram 400 illustrating communication between the editor dual instance manager 308 and the runtime dual instance manager 310. Various dual instance commands may be sent to the runtime dual instance manager 310 from the editor dual instance manager 308 and/or from the editor dual instance manager 308 to the runtime dual instance manager 310 via the established TCP connection.

In embodiments, different instances may run on different processes or even different devices, so pointers cannot be transferred between different instances. As a result, Global Unique Identifiers ("GUID") may be used to refer to an object and to establish a mapping relationship between different instances. An entity may be created in the editor. To create an entity in the editor, an Entity* and a Transform* may be created, and Entity* may be set to the Scene entities list, and Transform* may be set to its parent's child. Therefore, a set property command may first be sent to try to place the newly created Entity* in the entities list on the Runtime side. The command parameter will contain the newly created Entity's GUID. After Runtime receives this command, it will try to use this GUID to find the corresponding Entity object.

However, because this object is created in Editor, it may not be found. Therefore, Runtime sends a transport request command to the Editor, requesting the Editor to send a specified object. The Command may contain a GUID. After the Editor receives this Command, it will find the corresponding object from its Object Manager through GUID. After finding it, it will decompose the object into a series of dual instance commands. The commands may include a create object command, which contains RTTIName and GUID for the object. Runtime can create a new object after receiving the create object command. Some set property commands will send all properties of the object on the Editor side to Runtime. Finally, a transport response command may be sent, indicating that the object transfer is over. At this point, the required object (Entity*) for runtime may already be available, and the top set property command will continue to be executed, and the Entity* will be set to Scene entities. The overall execution process is similar to http server/client, where the Editor is the server, and the Runtime is the client.

It should be appreciated that, although the name is dual instance, dual instance can support an editor dual instance connection to multiple runtime dual instances. The dual instance commands also have two sending modes: broadcast, and request-response. Objects created in the editor but not used at runtime may not be transferred to runtime dual instance.

FIG. 5 illustrates a list 500 of exemplary dual instance commands. One or more of these commands may be sent to/from the editor dual instance manager 308 to/from the runtime dual instance manager 310. The dual instance commands include a reset command. The reset command may be used to reload an entire scene. Reloading an entire scene may be done by sending the object, one by one, from the editor to runtime. The dual instance commands include a reset request command. The reset request command may request the editor to run a reset. The dual instance commands include a read file command. The read file command may send a ReadFileResponse command to the editor dual instance manager 308. The dual instance commands include a read file response command. The editor may send a read file response command after the file is finished transferring to the runtime side. The dual instance commands include a transport command. The transport command may be used by the editor dual instance manager 308 to send the object to the runtime.

The dual instance commands include a transport response command. The transport response command may cause a globally unique identifier to be sent by the runtime dual instance manager 310 to the editor dual instance manager 308, which then finds the associated object and sends the entity and properties one by one from the editor to runtime. The dual instance commands include a transport sticker command. The transport sticker command may be used to transport stickers to a mobile device. The dual instance commands include a transport sticker response command. The transport sticker response command may be the response to the transport sticker command. The dual instance commands include a set property command. The set property command may set the property of a component in an entity. The dual instance commands include a create object command. The create object command may be called by the editor dual instance manager 308 when the transport command is in progress. This may send, to runtime dual instance manager 310, a command to create an object.

The dual instance commands include a set watch value command. The set watch value command may be used by ScriptGraph. Script Graph will insert some SetWatchValue calls into the generated lua file to transfer the current value of the temporary variable in lua from the runtime to the editor and then display the value on Graph's node port. The dual instance commands include a clear watch value, which may be used by ScriptGraph. The dual instance commands include an object path command. The object path command may be called by the editor dual instance manager 308 when a transport command is in progress. The object path command may send the (GUID, path) to the runtime. The runtime dual instance manager 310 obtains the object by using the GUID. This object may then be mapped to file in the asset database with the given path. The dual instance commands include a custom attribute command. The custom attribute command may transport some editor attributes to preview instance.

The dual instance commands include a call method command. The call method command may call RPC on the runtime dual instance manager 310. The dual instance commands include a get render texture (RT) data command. The get RT data command may be sent by the editor dual instance manager 308 to the runtime dual instance manager 310 to get the RT's render texture. It is used in the Effect Graph to get a preview of each node of the Effect Graph. The dual instance commands include a get RT data response command. The get RT data response command may be processed by the runtime dual instance manager 310 and may be used to obtain the RT. The dual instance commands include a command failed command. The command failed command may be used by the runtime dual instance manager 310 to let the editor know that the command failed to execute. The dual instance commands include an update script value command. The update script value command may be used by the editor to update the script component's value.

Figure 6:
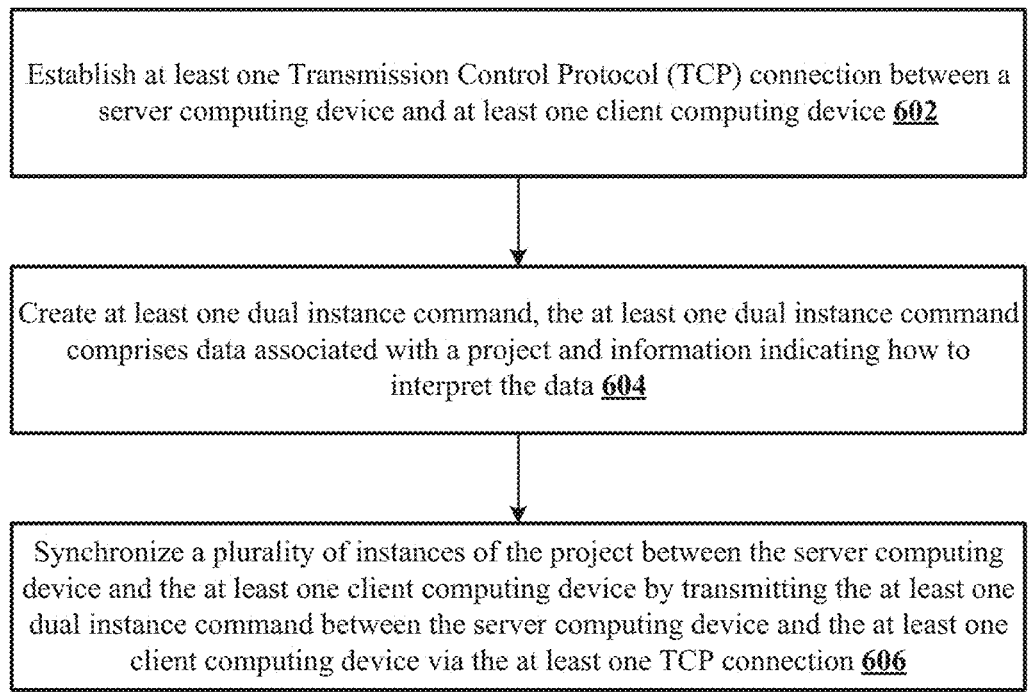
FIG. 6 shows an example process for running multiple preview windows using dual instance.

FIG. 6 illustrates an example process 600 performed by one or more components shown in the diagram 300. For example, the process 600 may be performed, at least in part, by a dual instance API (e.g., dual instance API 304). The process 600 may be performed to synchronize a plurality of instances associated with a project, such as a project associated with the design of an AR effect. Although depicted as a sequence of operations in FIG. 6, those of ordinary skill in the art will appreciate that various embodiments may add, remove, reorder, or modify the depicted operations.

As discussed above, a TCP connection may be established between a main process (e.g., server computing device) and a preview process (e.g., at least one client computing device). At 602, at least one TCP connection may be established between a server computing device and at least one client computing device. The server computing device may, for example, include the design service 118. The client computing device(s) may, for example, include the client devices 110a-n.

Data may be received from the server computing device. For example, the dual instance API 304 may receive data or properties. The data may be data associated with a design project. The data may be automatically detected/received, for example, if a designer makes a modification/change to a project, loads a new project, and/or reloads a project. The data associated with a project may comprise data indicative of an image or a video. For example, the data may include data indicative of any change made to the project by the server computing device. The data or properties may include, for example, data associated with reloading a project, data associated with an update to inspector properties, data associated with an update to an input stream, data associated with loading a new design project, and/or data associated with a change to an aspect ratio.

The received data may be serialized. The serialized data may then be encoded into at least one dual instance command. At 604, at least one dual instance command may be created. The at least one dual instance command comprises data associated with a project and information indicating how to interpret the data. A particular dual instance command can be tailored to serve a single purpose. Each command will have its own type of data, its own identifier, etc. The dual instance command(s) may comprise identification information indicative of a type of the dual instance command. Different types of dual instance commands are discussed above in more detail with regard to FIG. 5.

The client computing device(s) may receive and process the dual instance command(s). The processes dual instance command data may be utilized to sync properties of the project and/or sync the entire project between various instances of the game engine (1 Editor×N previews). At 606, a plurality of instances of the project may be synchronized between the server computing device and the at least one client computing device. The plurality of instances may be synchronized by transmitting the at least one dual instance command between the server computing device and the at least one client computing device via the at least one TCP connection. For example, the client computing device(s) may, after, processing the dual instance command data, create an input stream, process the effect on a runtime dual instance, and render the processed output. For example, when a new object (e.g., a cube) is added in the main preview window, this addition may be instantly synchronized across all the preview instances (e.g., secondary preview windows). This guarantees that all instances of the project instances are identical.

Figure 7:
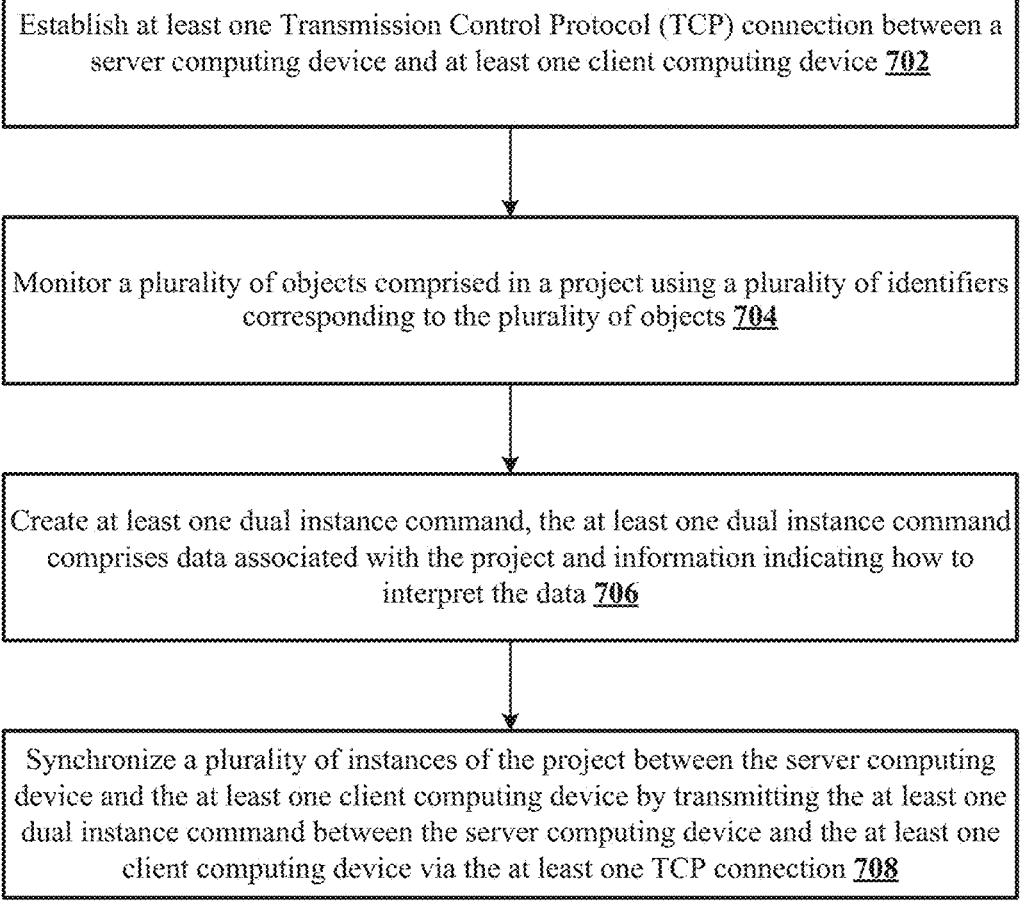
FIG. 7 shows another example process for running multiple preview windows using dual instance.

FIG. 7 illustrates an example process 700 performed by one or more components shown in the diagram 300. For example, the process 700 may be performed, at least in part, by a dual instance API (e.g., dual instance API 304). The process 700 may be performed to synchronize a plurality of instances associated with a project, such as a project associated with the design of an AR effect. Although depicted as a sequence of operations in FIG. 7, those of ordinary skill in the art will appreciate that various embodiments may add, remove, reorder, or modify the depicted operations.

As discussed above, a TCP connection may be established between a main process (e.g., server computing device) and a preview process (e.g., at least one client computing device). At 702, at least one TCP connection may be established between a server computing device and at least one client computing device. The server computing device may, for example, include the design service 118. The client computing device(s) may, for example, include the client devices 110a-n.

At 704, a plurality of objects comprised in a project may be monitored using a plurality of identifiers corresponding to the plurality of objects. Monitoring the plurality of objects may comprise determining that a change has been made to one or more of the plurality of objects. If it is determined that a change has been made to one or more of the plurality of objects, data indicative of this change may be automatically sent from the server computing device. For example, the dual instance API 304 may receive data or properties from the server computing device. The received data may be indicative of the change has been made to one or more of the plurality of objects. The data associated with a project may comprise data indicative of an image or a video. The data or properties may include, for example, data associated with reloading a project, data associated with an update to inspector properties, data associated with an update to an input stream, data associated with loading a new design project, and/or data associated with a change to an aspect ratio.

The received data may be serialized. The serialized data may then be encoded into at least one dual instance command. At 706, at least one dual instance command may be created. The at least one dual instance command comprises data associated with a project and information indicating how to interpret the data. A particular dual instance command can be tailored to serve a single purpose. Each command will have its own type of data, its own identifier, etc. The dual instance command(s) may comprise identification information indicative of a type of the dual instance command. Different types of dual instance commands are discussed above in more detail with regard to FIG. 5.

The client computing device(s) may receive and process the dual instance command(s). The processes dual instance command data may be utilized to sync properties of the project and/or sync the entire project between various instances of the game engine (1 Editor×N previews). At 708, the plurality of instances of the project may be synchronized between the server computing device and the at least one client computing device. The plurality of instances may be synchronized by transmitting the at least one dual instance command between the server computing device and the at least one client computing device via the at least one TCP connection. For example, the client computing device(s) may, after, processing the dual instance command data, create an input stream, process the effect on a runtime dual instance, and render the processed output. For example, when a new object (e.g., a cube) is added in the main preview window, this addition may be instantly synchronized across all the preview instances (e.g., secondary preview windows). This guarantees that all instances of the project instances are identical.

Figure 8:
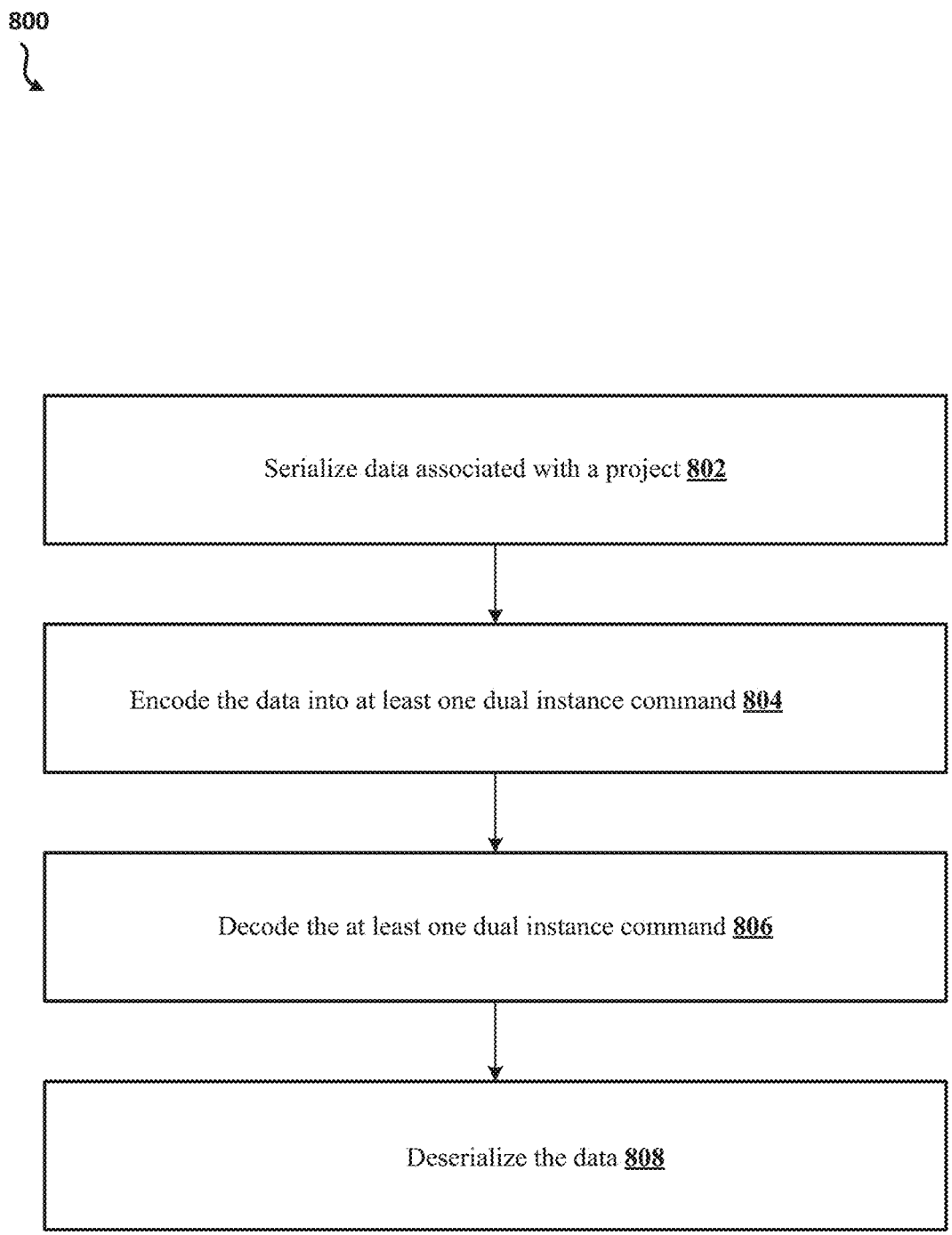
FIG. 8 shows another example process for encoding and decoding dual instance commands.

FIG. 8 illustrates an example process 800 performed by one or more components shown in the diagram 300. For example, the process 800 may be performed, at least in part, by a dual instance API (e.g., dual instance API 304). The process 800 may be performed to synchronize a plurality of instances associated with a project, such as a project associated with the design of an AR effect. Although depicted as a sequence of operations in FIG. 8, those of ordinary skill in the art will appreciate that various embodiments may add, remove, reorder, or modify the depicted operations.

The dual instance API 304 may receive, such as from the main process 302, data or properties. The data may be data associated with a design project. The data may be automatically detected/received, for example, if a designer makes a modification/change to a project, loads a new project, and/or reloads a project. The data associated with a project may comprise data indicative of an image or a video. For example, the data may include data indicative of any change made to the project by the server computing device. The data or properties may include, for example, data associated with reloading a project, data associated with an update to inspector properties, data associated with an update to an input stream, data associated with loading a new design project, and/or data associated with a change to an aspect ratio.

In embodiments, the dual instance API 304 may, in response to receiving the data, serialize the data. At 802, the data may be serialized. The serialized data may then be encoded into at least one dual instance command. At 804, the data may be encoded into at least one dual instance command. As described above, dual instance commands are protocols that contain data and identifiers. A particular dual instance command can be tailored to serve a single purpose. Each command will have its own type of data, its own identifier, etc. The dual instance command(s) may comprise identification information indicative of a type of the dual instance command. There may be a plurality of types of dual instance commands.

In embodiments, the dual instance API 304 may send or forward the dual instance command(s), such as to the editor dual instance manager 308. The editor dual instance manager 308 may then send, via the TCP connection, the dual instance command(s) to the runtime dual instance manager 310. The runtime dual instance manager 310 may, in response to receiving the dual instance command(s), decode the at least one dual instance command. At 806, the at least one dual instance command may be decoded. The decoded dual instance command may then be deserialized. At 808, the data associated with the dual instance command may be deserialized.

The runtime dual instance manager 310 may then send the dual instance command and its attached data to the preview process 306. The preview process 306 may receive the dual instance command data from the dual instance API 304. The preview process 306 may process the received dual instance command data and utilize it to sync properties and/or sync the entire project between various instances of the game engine.

Figure 9:
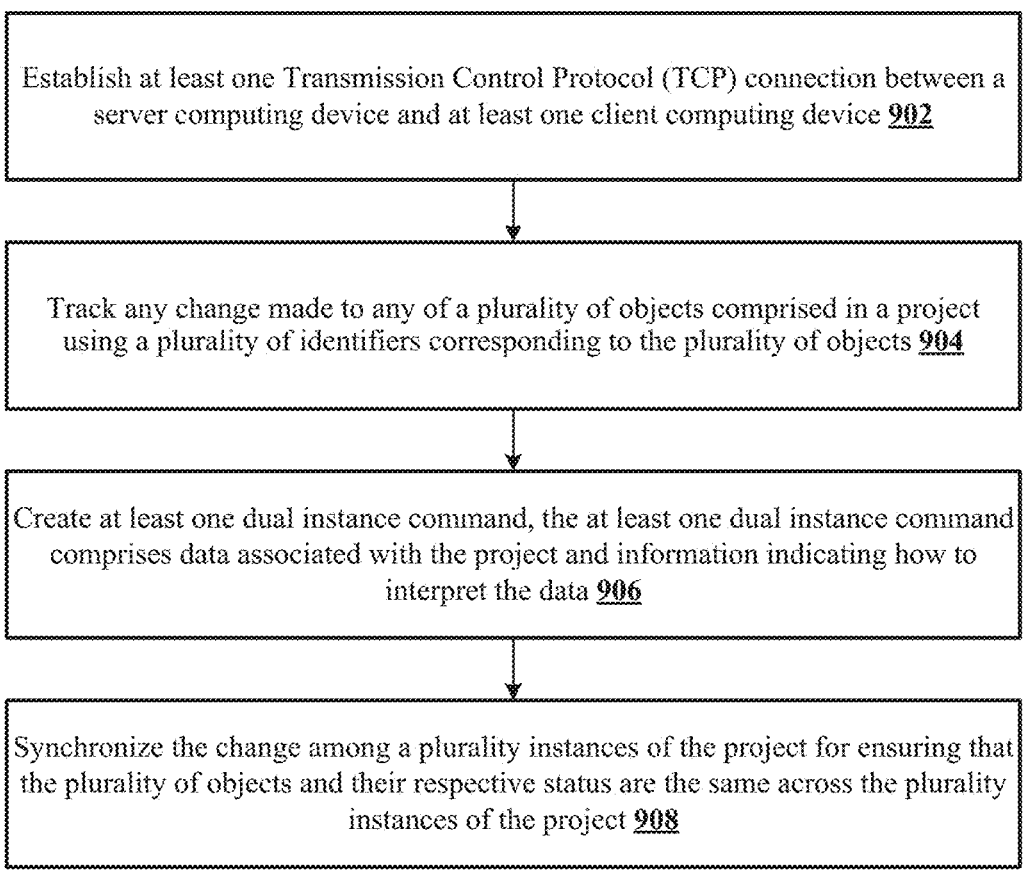
FIG. 9 shows another example process for running multiple preview windows using dual instance.

FIG. 9 illustrates an example process 900 performed by one or more components shown in the diagram 300. For example, the process 900 may be performed, at least in part, by a dual instance API (e.g., dual instance API 304). The process 900 may be performed to synchronize a plurality of instances associated with a project, such as a project associated with the design of an AR effect. Although depicted as a sequence of operations in FIG. 9, those of ordinary skill in the art will appreciate that various embodiments may add, remove, reorder, or modify the depicted operations.

As discussed above, a TCP connection may be established between a main process (e.g., server computing device) and a preview process (e.g., at least one client computing device). At 902, at least one TCP connection may be established between a server computing device and at least one client computing device. The server computing device may, for example, include the design service 118. The client computing device(s) may, for example, include the client devices 110*a-n*.

At 904, any change made to any of a plurality of objects comprised in a project may be tracked using a plurality of identifiers corresponding to the plurality of objects. If it is determined that a change has been made to one or more of the plurality of objects, data indicative of this change may be automatically sent from the server computing device. For example, the dual instance API 304 may receive data or properties from the server computing device. The received data may be indicative of the change has been made to one or more of the plurality of objects. The data associated with a project may comprise data indicative of an image or a video. The data or properties may include, for example, data associated with reloading a project, data associated with an update to inspector properties, data associated with an update to an input stream, data associated with loading a new design project, and/or data associated with a change to an aspect ratio.

The received data may be serialized. The serialized data may then be encoded into at least one dual instance command. At 906, at least one dual instance command may be created. The at least one dual instance command comprises data associated with a project and information indicating how to interpret the data. A particular dual instance command can be tailored to serve a single purpose. Each command will have its own type of data, its own identifier, etc. The dual instance command(s) may comprise identification information indicative of a type of the dual instance command. Different types of dual instance commands are discussed above in more detail with regard to FIG. 5.

The client computing device(s) may receive and process the dual instance command(s). The processes dual instance command data may be utilized to sync properties of the project and/or sync the entire project between various instances of the game engine (1 Editor×N previews). At 908, the changes may be synchronized among a plurality instances of the project for ensuring that the plurality of objects and their respective status are the same across the plurality instances of the project. The changes may be synchronized by transmitting the at least one dual instance command between the server computing device and the at least one client computing device via the at least one TCP connection. For example, the client computing device(s) may, after, processing the dual instance command data, create an input stream, process the effect on a runtime dual instance, and render the processed output. For example, when a new object (e.g., a cube) is added in the main preview window, this addition may be instantly synchronized across all the preview instances (e.g., secondary preview windows). This guarantees that all instances of the project instances are identical.

FIG. 10 illustrates an example process 1000 performed by one or more components shown in the diagram 300. For example, the process 1000 may be performed, at least in part, by a dual instance API (e.g., dual instance API 304). The process 1000 may be performed to synchronize a plurality of instances associated with a project, such as a project associated with the design of an AR effect. Although depicted as a sequence of operations in FIG. 10, those of ordinary skill in the art will appreciate that various embodiments may add, remove, reorder, or modify the depicted operations.

As discussed above, the dual instance API 304 may include an editor dual instance manager (e.g., editor dual instance manager 308). At 1002, an editor dual instance manager may be created. The editor dual instance manager may hold a server socket. The editor dual instance manager may additionally or alternatively include information indicative of at least one Internet Protocol (IP) address and at least one port number associated with the at least one client computing device.

Likewise, the dual instance API 304 may include a runtime dual instance manager (e.g., runtime dual instance manager 310). At 1004, at least one runtime dual instance manager may be created. The runtime dual instance manager may hold a client socket. The runtime dual instance manager may additionally or alternatively include information indicative of an IP address and a port number associated with the server computing device.

As discussed above, a TCP connection may be established between a main process (e.g., server computing device) and a preview process (e.g., at least one client computing device). At 1006, at least one TCP connection may be established between a server computing device and at least one client computing device. The server computing device may, for example, include the design service 118. The client computing device(s) may, for example, include the client devices 110*a-n*. Establishing the TCP connection may comprise establishing a TCP connection between the editor dual instance manager and the runtime dual instance manager.

Data may be received from the server computing device. For example, the dual instance API 304 may receive data or properties. The data may be data associated with a design project. The data may be automatically detected/received, for example, if a designer makes a modification/change to a project, loads a new project, and/or reloads a project. The data associated with a project may comprise data indicative of an image or a video. For example, the data may include data indicative of any change made to the project by the server computing device. The data or properties may include, for example, data associated with reloading a project, data associated with an update to inspector properties, data associated with an update to an input stream, data associated with loading a new design project, and/or data associated with a change to an aspect ratio.

The received data may be serialized. The serialized data may then be encoded into at least one dual instance command. At 1008, at least one dual instance command may be created. The at least one dual instance command comprises data associated with a project and information indicating how to interpret the data. A particular dual instance command can be tailored to serve a single purpose. Each command will have its own type of data, its own identifier, etc. The dual instance command(s) may comprise identification information indicative of a type of the dual instance command. Different types of dual instance commands are discussed above in more detail with regard to FIG. 5.

The client computing device(s) may receive and process the dual instance command(s). The processes dual instance command data may be utilized to sync properties of the project and/or sync the entire project between various instances of the game engine (1 Editor×N previews). At 1010, the plurality of instances of the project may be synchronized between the server computing device and the at least one client computing device. The plurality of instances may be synchronized by transmitting the at least one dual instance command between the server computing device and the at least one client computing device via the at least one TCP connection. For example, the client computing device(s) may, after, processing the dual instance command data, create an input stream, process the effect on a runtime dual instance, and render the processed output. For example, when a new object (e.g., a cube) is added in the main preview window, this addition may be instantly synchronized across all the preview instances (e.g., secondary preview windows). This guarantees that all instances of the project instances are identical.

At 1012, a second plurality of instances of a second project may be synchronized between the server computing device and the at least one client computing device. The second plurality of instances may be synchronized by transmitting at least one second dual instance command between the server computing device and the at least one client computing device.

Figure 11:
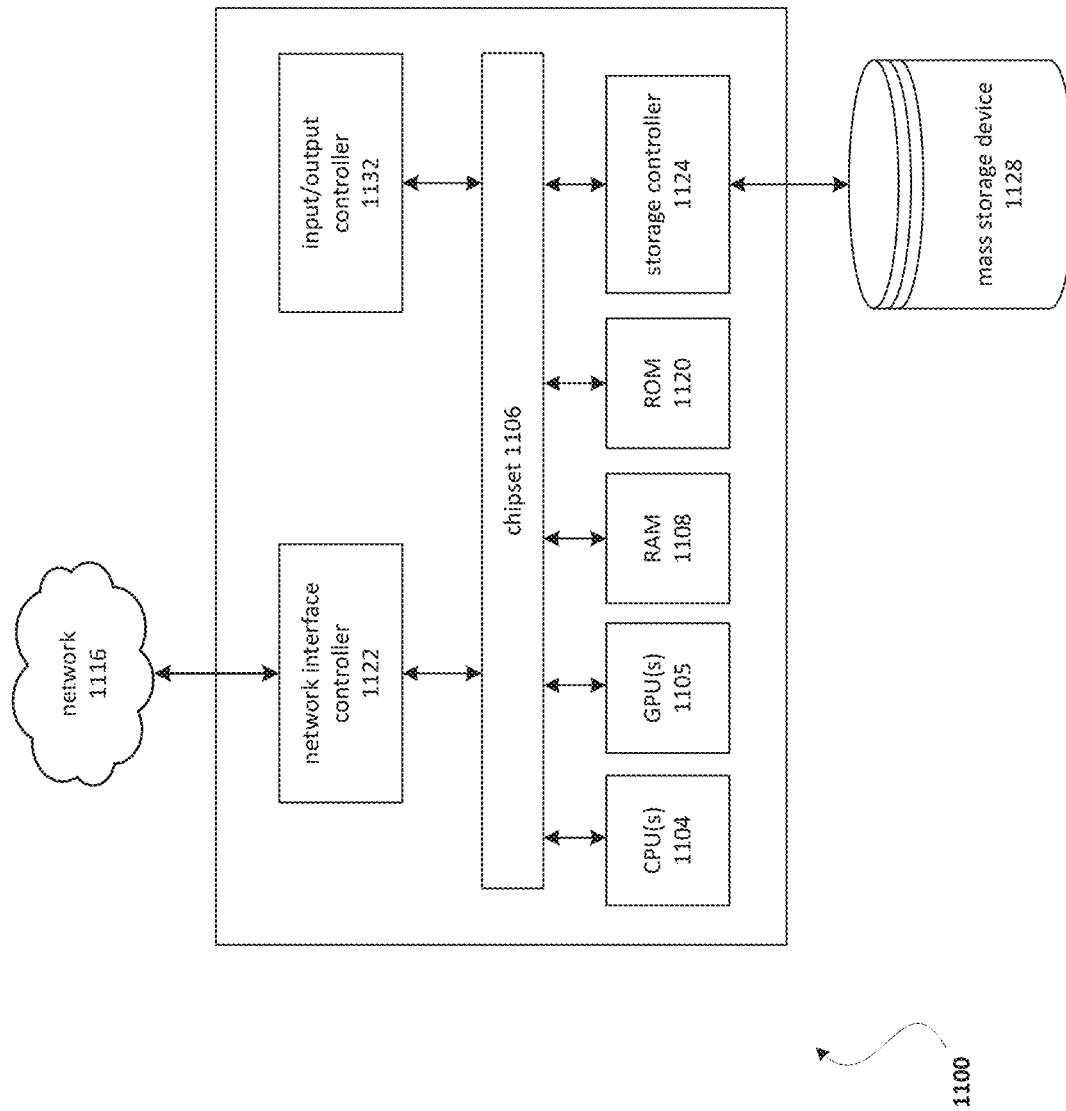
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1111. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of synchronizing a plurality of instances of an effect design project, comprising:
   establishing at least one Transmission Control Protocol (TCP) connection between a main process and at least one preview process, wherein the main process corresponds to a host instance of the effect design project and is associated with a main preview window, wherein the at least one preview process corresponds to at least one secondary instance of the effect design project and is associated with at least one secondary preview window, wherein a dual instance comprising the host instance and the at least one secondary instance is configured to seamlessly transmit an update in the host instance to the at least one secondary instance, wherein the dual instance is further configured to transmit final processed data from the at least one secondary instance to the host instance, and wherein the at least one secondary preview window is configured to enable testing and comparison of different versions of the effect design project at an approximately same time;
   creating at least one dual instance command, the at least one dual instance command comprises data associated with the project and information indicating how to interpret the data; and
   synchronizing the plurality of instances of the effect design project between the main process and the at least one preview process by transmitting the at least one dual instance command via the at least one TCP connection.

2. The method of claim 1, further comprising:
   monitoring a plurality of objects comprised in the effect design project using a plurality of identifiers corresponding to the plurality of objects.

3. The method of claim 1, further comprising:
   tracking any change made to any of a plurality of objects comprised in the effect design project using a plurality of identifiers corresponding to the plurality of objects; and
   synchronizing the change among the plurality instances of the effect design project for ensuring that the plurality of objects and their respective status are the same across the plurality instances of the project.

4. The method of claim 1, wherein the at least one dual instance command comprises identification information indicative of a type of the at least one dual instance command, and wherein there are a plurality of types of dual instance commands.

5. The method of claim 1, further comprising:
   creating an editor dual instance manager, wherein the editor dual instance manager holds a server socket and information indicative of at least one Internet Protocol (IP) address and at least one port number associated with at least one client computing device on which the at least one preview process is running; and
   creating at least one runtime dual instance manager, wherein the at least one runtime dual instance manager holds a client socket and information indicative of an Internet Protocol (IP) address and a port number associated with a server computing device on which the main process is running.

6. The method of claim 1, further comprising:
serializing the data; and
encoding the data into the at least one dual instance command.

7. The method of claim 1, further comprising:
decoding the at least one dual instance command; and
deserializing the data.

8. The method of claim 1, wherein the data associated with the project comprise data indicative of any change made to the project by the main process or by the at least one preview process.

9. The method of claim 1, wherein the data associated with the effect design project comprise data indicative of an image or a video.

10. The method of claim 1, further comprising:
synchronizing a second plurality of instances of a second effect design project by transmitting at least one second dual instance command via the at least one TCP connection.

11. A system of synchronizing a plurality of instances of an effect design project, comprising:
at least one processor; and
at least one memory comprising computer-readable instructions that upon execution by the at least one processor cause the system to perform operations comprising:
establishing at least one Transmission Control Protocol (TCP) connection between a main process and at least one preview process, wherein the main process corresponds to a host instance of the effect design project and is associated with a main preview window, wherein the at least one preview process corresponds to at least one secondary instance of the effect design project and is associated with at least one secondary preview window, wherein a dual instance comprising the host instance and the at least one secondary instance is configured to seamlessly transmit an update in the host instance to the at least one secondary instance, wherein the dual instance is further configured to transmit final processed data from the at least one secondary instance to the host instance, and wherein the at least one secondary preview window is configured to enable testing and comparison of different versions of the effect design project at an approximately same time;
creating at least one dual instance command, the at least one dual instance command comprises data associated with the project and information indicating how to interpret the data; and
synchronizing the plurality of instances of the effect design project between the main process and the at least one preview process by transmitting the at least one dual instance command via the at least one TCP connection.

12. The system of claim 11, the operations further comprising:
tracking any change made to any of a plurality of objects comprised in the effect design project using a plurality of identifiers corresponding to the plurality of objects; and
synchronizing the change among the plurality instances of the effect design project for ensuring that the plurality of objects and their respective status are the same across the plurality instances of the project.

13. The system of claim 11, the operations further comprising:
creating an editor dual instance manager, wherein the editor dual instance manager holds a server socket and information indicative of at least one Internet Protocol (IP) address and at least one port number associated with at least one client computing device on which the at least one preview process is running; and
creating at least one runtime dual instance manager, wherein the at least one runtime dual instance manager holds a client socket and information indicative of an Internet Protocol (IP) address and a port number associated with a server computing device on which the main process is running.

14. The system of claim 11, wherein the at least one dual instance command comprises identification information indicative of a type of the at least one dual instance command, and wherein there are a plurality of types of dual instance commands.

15. The system of claim 11, the operations further comprising:
synchronizing a second plurality of instances of a second effect design project by transmitting at least one second dual instance command via the at least one TCP connection.

16. A non-transitory computer-readable storage medium, storing computer-readable instructions that upon execution by a processor cause the processor to implement operations, the operation comprising:
establishing at least one Transmission Control Protocol (TCP) connection between a main process and at least one preview process, wherein the main process corresponds to a host instance of an effect design project and is associated with a main preview window, wherein the at least one preview process corresponds to at least one secondary instance of the effect design project and is associated with at least one secondary preview window, wherein a dual instance comprising the host instance and the at least one secondary instance is configured to seamlessly transmit an update in the host instance to the at least one secondary instance, wherein the dual instance is further configured to transmit final processed data from the at least one secondary instance to the host instance, and wherein the at least one secondary preview window is configured to enable testing and comparison of different versions of the effect design project at an approximately same time;
creating at least one dual instance command, the at least one dual instance command comprises data associated with a project and information indicating how to interpret the data; and
synchronizing a plurality of instances of the effect design project between the main process and the at least one preview process by transmitting the at least one dual instance command via the at least one TCP connection.

17. The non-transitory computer-readable storage medium of claim 16, the operations further comprising:
tracking any change made to any of a plurality of objects comprised in the effect design project using a plurality of identifiers corresponding to the plurality of objects; and
synchronizing the change among the plurality instances of the effect design project for ensuring that the plurality of objects and their respective status are the same across the plurality instances of the project.

18. The non-transitory computer-readable storage medium of claim 16, the operations further comprising:

creating an editor dual instance manager, wherein the editor dual instance manager holds a server socket and information indicative of at least one Internet Protocol (IP) address and at least one port number associated with at least one client computing device on which the at least one preview process is running; and creating at least one runtime dual instance manager, wherein the at least one runtime dual instance manager holds a client socket and information indicative of an Internet Protocol (IP) address and a port number associated with a server computing device on which the main process is running.

19. The non-transitory computer-readable storage medium of claim 16, wherein the at least one dual instance command comprises identification information indicative of a type of the at least one dual instance command, and wherein there are a plurality of types of dual instance commands.

20. The non-transitory computer-readable storage medium of claim 16, the operations further comprising:

synchronizing a second plurality of instances of a second effect design project by transmitting at least one second dual instance command via the at least one TCP connection.

* * * * *